3,161,657
CYCLIC ETHER OF TETRAHYDROPYRAN AND PROCESS FOR THE MANUFACTURE THEREOF
Albert Eschenmoser, Zurich, Switzerland, Casimir F. Seidel, deceased, late of Zurich, Switzerland, by Jakob Diggelmann, administrator, Zurich, Switzerland, and Dorothea Felix, Zurich, Switzerland, assignors to Firmenich & Cie, Geneva, Switzerland, a corporation of Switzerland
No Drawing. Filed Nov. 3, 1961, Ser. No. 150,097
Claims priority, application Switzerland, Nov. 5, 1960, 12,390/60
10 Claims. (Cl. 260—345.1)

The present invention relates to a new composition of matter comprising a cyclic ether of the tetrahydropyran series which has valuable odoriferous properties and is, therefore, useful in the perfumery art. The invention also relates to a process for the manufacture of said new composition of matter. Furthermore, the invention includes odoriferous compositions comprising said new composition of matter as one of their ingredients.

The cyclic ether of this invention is 2-(2-methyl-1-propen-1-yl)-4-methyl-tetrahydropyran which can be represented by the following structural formula

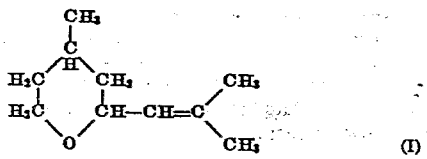

The tetrahydropyran derivative represented by Formula I forms two isomers which have the cis and trans configuration, respectively, with regard to the substituents in the positions 2 and 4. Each of these isomers exists in optically active forms.

According to this invention the new tetrahydropyran derivative is prepared by subjecting to an acid-catalyzed cycling reaction a member selected from the group consisting of 1-hydroxy-3,7-dimethyl-4,6-octadiene, 1-hydroxy-3,7-dimethyl-5,7-octadiene and mixtures thereof. If desired, the cis and trans isomers of 2-(2-methyl-1-propen-1-yl)-4-methyl-tetrahydropyran can be individually separated from the cyclization product.

The starting material used in the cyclization of this invention can be obtained by reacting citronellyl acetate (II) with bromosuccinimide, dehydrobrominating the citronellyl acetate monobromides (IIa and IIb) obtained as a mixture and hydrolyzing the resulting mixtures of diene-acetates (IIIa and IIIb). In this manner a mixture of 1-hydroxy-3,7-dimethyl-4,6-octadiene and 1-hydroxy-3,7-dimethyl-5,7-octadiene (Va and Vb) is obtained. The individual alcohols can be separated from this mixture by subjecting the latter to adsorption chromatography on alumina. However, since both alcohols react in the same manner in the cyclization step of this invention, it is preferred to use the mixture of alcohols prepared as described above as the starting material in the process of this invention.

The reactions involved in the preparation of the starting alcohols can be represented by the following reaction scheme:

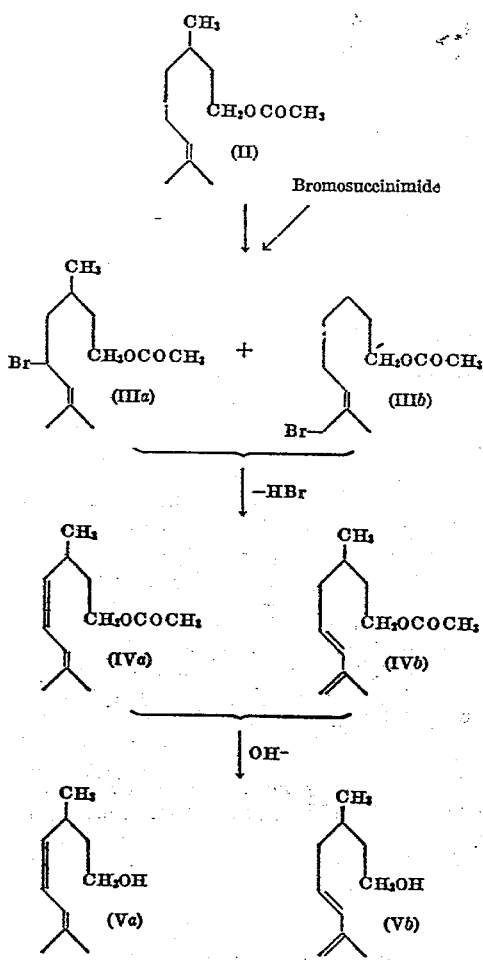

The cyclization step of this invention can be carried out by heating the starting alcohol or alcohol mixture in the presence of catalytic amounts of an aryl sulfonic acid, e.g. benzene sulfonic acid or p-toluene sulfonic acid, as the cyclizing catalyst. Conveniently an inert organic solvent such as a hydrocarbon solvent, e.g. benzene or toluene, is used as the reaction medium.

According to a preferred embodiment of this invention the cyclization is carried out by dissolving a mixture of 1-hydroxy-3,7-dimethyl-4,6-octadiene and 1-hydroxy-3,7-dimethyl-5,7-octadiene prepared as described above together with catalytic amounts of p-toluene sulfonic acid in benzene or toluene and refluxing the solution at ordinary pressure for about one or more hours. The cyclization reaction is also preferably carried out in a nitrogen atmosphere.

The major portion of the cyclization product obtained according to this invention consists of a mixture of the cis and trans isomers of the 2-(2-methyl-1-propen-1-yl)-4-methyl-tetrahydropyran. In addition, the cycylization product contains minor amounts of isomers in which the double bond of the tetrahydropyran derivative is shifted towards the nucleus or the end of the lateral chain (olefinic structural isomers). The weight ratio between the cis and the trans isomers formed in the cyclization varies according to the conditions under which the cyclization is carried out and is influenced by the particular type of cyclizing catalyst used. The cis and trans isomers can be separated by fractional distillation, by adsorption chromatography on alumina or by a combination of these methods. The individual isomers can also be obtained in pure form by preparative gas-liquid chromatography.

If dextro-rotatory citronellyl acetate is used for preparing the starting alcohol or alcohols, the major portion of the cyclization product will consist of (+)-cis- and -trans-2-(2-methyl-1-propen-1-yl)-4-methyl - tetrahydropyran. On the other hand, if levo-rotatory citronellyl acetate is used, a cyclization product containing as the major portion (—)-cis- and -trans-2-(2-methyl-1-propen-1-yl)-4-methyl-tetrahydropyran will be obtained. Likewise, the racemates of the cis and trans isomers of the tetrahydropyran derivative will form from optically inactive citronellyl acetate.

Both in the cis and trans configuration the cyclic ether of this invention possesses interesting and valuable odoriferous properties which make it useful in numerous applications in the art of perfumery. The new cyclic ether is useful for reinforcing or enhancing the top note of many synthetic, semi-synthetic and natural perfume essences. In certain cases the floral note of perfume compositions can be substantially stressed or exalted by incorporating the tetrahydropyran derivative. Thus, it can be added to synthetic floral essences such as rose essences, geranium essences and the like, or to fancy perfume compositions.

The cis and trans isomers of 2-(2-methyl-1-propen-1-yl)-4-methyl-tetrahydropyran possess very similar odoriferous properties. The odor of the trans isomer is somewhat more powerful than that of the cis isomer. On the other hand, the latter has a finer odor than the trans isomer. The two isomers can be used in odoriferous compositions either individually or as mixtures. The amounts of the new cyclic ether required for obtaining the desired odor effect vary within a wide range and depend upon the particular odor type of the perfume composition to be prepared or improved. As an example, the proportions of the cyclic ether to be used may vary between 0.1% and several percent of the total weight of an odoriferous composition. In a synthetic rose essence, for example, the tetrahydropyran derivative can be present in a proportion of 0.1% to 0.5% of the total weight of the essence. Larger amounts, for instance up to 5%, may be used for preparing or improving perfume essences such as synthetic essence of Geranium Bourbon or fancy perfume essences.

The invention will be further illustrated by the following examples, however, without being limited thereto. The temperatures are given in centrigrade degrees.

*Example 1*

50 g. of citronellyl acetate (prepared from citronellol of $\alpha_D = +3.3°$) are dissolved in 200 ml. of carbon tetrachloride. The solution is refluxed for 1 hour while adding 55 g. of N-bromo-succinimide in portions. The reaction mixture is cooled and after addition of 200 ml. of petroleum ether it is filtered. The filtrate is washed with water. After concentration there are obtained 71.5 g. of a mixture of crude citronellyl acetate monobromides.

Fractional distillation of the crude mixture yields 35 g. of citronellyl acetate monobromides ($C_{12}H_{21}O_2Br$)

B.P.$_{0.09\ mm.}$ = 97–98°

$n_D$ = 1.4868.

71.5 g. of a mixture of crude monobromides prepared as described above are refluxed for 9 hours in 800 ml. of dimethylformamide in the presence of 80 g. of lithium chloride and 20 g. of lithium carbonate in a nitrogen atmosphere. After cooling, the reaction mixture is poured onto ice, and the reaction product is extracted with petroleum ether. The extract is washed with water.

Upon evaporation of the petroleum ether there are obtained 44.2 g. of a crude product which is subjected to fractional distillation and yields 16.5 g. of a fraction distilling between 64 and 68° at 0.3 mm. Hg. This fraction is redistilled for analysis (B.P.$_{0.2\ mm.}$ = 60–61°).

*Analysis.*—Calculated for $C_{12}H_{20}O_2$: C, 73.43%; H, 10.27%. Found: C, 73.37%; H, 10.18%.

The product obtained is a mixture of the acetates of 1-hydroxy-3,7-dimethyl-4,6-octadiene and 1-hydroxy-3,7-dimethyl-5,7-octadiene.

U.V. spectrum: $\lambda_{max.}$ = 231.5 m$\mu$, $\epsilon$ = 10,700; first shoulder at $\lambda_{max.}$ = 225 m$\mu$, $\epsilon$ = 9600; second shoulder at $\lambda_{max.}$ = 235 m$\mu$, $\epsilon$ = 8500.

6 g. of a mixture of diene-acetates prepared as described above (B.P.$_{0.3\ mm.}$ = 64–68°), 36 ml. of methanol, 4 ml. of water and 4 g. of potassium hydroxide are allowed to react for 24 hours at room temperature in a nitrogen atmosphere. The methanol is then evaporated under reduced pressure, the residue is poured onto ice, the mixture is extracted with petroleum ether, and the extract is washed with water and then concentrated. There are thus obtained 4.5 g. of a mixture of 1-hydroxy-3,7-dimethyl-4,6-octadiene and 1-hydroxy-3,7-dimethyl-5,7-octadiene; B.P.$_{0.5\ mm.}$ = 72–74°; $n_D^{23}$ = 1.4740. U.V. spectrum: $\lambda_{max.}$ = 232 m$\mu$, $\epsilon$ = 9700 (one shoulder each precedes and follows this maximum).

1 g. of a mixture of diene alcohols prepared as described above is dissolved together with 62 mg. of crystalline p-toluene sulfonic acid (containing 1 molecule of crystallization water) in 5 ml. of absolute benzene. The solution is refluxed for one hour. The reaction mixture is then washed with aqueous sodium carbonate until neutral and concentrated. There is thus obtained 1 g. of a crude product containing the cis and trans isomers of 2-(2-methyl-1-propen-1-yl)-4-methyl-tetrahydropyran.

3.01 g. of a crude product prepared as described above are distilled twice over sodium. There are obtained 1.218 g. of a fraction distilling between 70 and 72° at 11 mm.; $n_D^{22.5}$ = 1.4527. This product consists mainly of a mixture of (+)-cis- and (+)-trans-2-(2-methyl-1-propen-1-yl)-4-methyl-tetrahydropyran in a weight ratio of about 9:1 and contains in addition minor amounts of olefinic structural isomers.

The above fraction ($n_D^{22.5}$ = 1.4527) yields on fractional distillation (e.g. in a spinning band column) or preparative gas-liquid chromatography 0.85 g. of pure 2-(2-methyl - 1 - propen - 1 - yl) - 4 - methyl-tetrahydropyran, B.P.$_{11\ mm.}$ = 70–72°, $n_D^{21}$ = 1.4536, $\alpha_D$ = +31.4°.

*Analysis.*—Calculated for $C_{10}H_{18}O$: C, 77.86%; H, 11.76%. Found: C, 77.65%; H, 11.60%.

Retention indices (gas-liquid chromatography): $I_{pol.}$ = 1294 (T. 190°), $I_{apol.}$ = 1122 (T. 190°).

The corresponding trans-isomer is obtained by gas-liquid chromatography of a mixture obtained by cyclization of the starting alcohols and distillation of the cyclization product in the manner described above. The trans isomer has the following physical properties: $d_4^{20}$ = 0.8865, $n_D^{20}$ = 1.4580. Its boiling point lies about 1 to 2° above that of the cis isomer. The retention indices (gas-liquid chromatography) as as follows: $I_{apol.}$ = 1146 (T. = 190°), $I_{pol.}$ = 1316 (T. = 190°).

The gas-chromatographic separations were carried out by means of a gas-liquid chromatography apparatus according to E. Heilbronner, E. Kovats, and W. Simon, Helv. 40, 2410 (1957), and E. Kovats, W. Simon, and E. Heilbronner, Helv. 41, 275 (1958). Nitrogen was used as the carrier gas.

The following examples relate to odoriferous compositions and illustrate the use of the tetrahydropyran derivatives of this invention in compounding and improving perfume compositions.

In the preparation of odoriferous compositions it is not necessary to use the cyclic ether of the invention in the form of a highly purified product. A less pure product, e.g. the product obtained by distillation of the crude cyclization product, gives a similar result.

*Example 2*

A synthetic rose essence is prepared by mixing the ingredients set forth hereinafter.

| Ingredients: | Parts by weight |
|---|---|
| Nonyl alcohol | 25 |
| Phenylethyl alcohol | 150 |
| Citronellol | 2,030 |
| Rhodinol | 3,400 |
| Geraniol | 1,200 |
| Nerol | 600 |
| Linalool | 40 |
| Fornesol | 20 |
| Nonanal | 40 |
| Phenylacetic aldehyde | 12 |
| Citral | 60 |
| Carvone | 25 |
| Rhodinyl acetate | 350 |
| Methyl phenylacetate | 20 |
| Methyleugenol | 116 |
| Eugenol | 100 |
| (+)-Cis-2-(2-methyl-1-propen-1-yl)-4-methyl-tetrahydropyran | 12 |
| Stearoptene | 1,800 |
| | 10,000 |

*Examples 3 and 4*

Synthetic geranium essences are prepared by mixing the ingredients set forth hereinafter:

| Ingredients | Parts by weight | |
|---|---|---|
| | Ex. 3 | Ex. 4 |
| Geraniol | 64 | 40 |
| Citronellol | | 27 |
| Terpineol | 3 | 3 |
| Diphenyloxide | 3 | 5 |
| Citronellyl formate | 10 | 9 |
| Geranyl acetate | 5 | 3 |
| Mixture of (+)-cis- and (+)-trans-2-(2-Methyl-1-propen-1-yl)-4-methyl-tetrahydropyran (weight ratio about 9:1) | 1 | 2 |
| Geranium terpenes | 10 | 6 |
| | 100 | 100 |

By incorporating the cyclic ether of this invention in synthetic rose and geranium essences of the type described in Examples 2 to 4 the top note of these essences is substantially enhanced. Moreover, the odors of these essences are made more similar to that of natural rose and geranium essences.

*Example 5*

A fancy perfume composition of a floral type is prepared by mixing the ingredients set forth hereinafter.

| Ingredients: | Parts by weight |
|---|---|
| Rhodinol | 180 |
| Phenylethyl alcohol | 120 |
| Linalool | 40 |
| | 340 |
| Report | 340 |
| Nonanal, 10% in diethyl phthalate | 5 |
| Undecanal, 10% in diethyl phthalate | 20 |
| Dodecanal, 10% in diethyl phthalate | 5 |
| α-Methyl-p-isopropyl-phenyl-propion-aldehyde, 10% in diethyl phthalate | 25 |
| Dimethylacetal of phenylacetaldehyde | 5 |
| Undecanolide, 10% in diethyl phthalate | 20 |
| Amyl cinnamic aldehyde | 30 |
| Benzyl acetate | 90 |
| Hydroxycitronellal | 150 |

*Example 5—Continued*

| | |
|---|---|
| Methyl-ionone | 60 |
| Heliotropine | 30 |
| Musk ambrette | 10 |
| Musk ketone | 40 |
| Civet, natural, 10% in diethyl phthalate | 10 |
| Vanillin | 5 |
| Eugenol | 15 |
| Benzyl salicylate | 25 |
| Bergamot oil | 50 |
| Ylang oil | 30 |
| Neroli bigarade oil | 10 |
| Santalol | 20 |
| 2-(2-methyl-1-propen-1-yl)-4-methyl-tetrahydropyran [1] | 5 |
| | 1000 |

[1] Either the (+)-cis isomer or a mixture of the (+)-cis- and (+)-trans isomers.

In the odoriferous compositions described in Examples 2 to 5 the trans isomer of the tetrahydropyran derivative can be substituted for the cis isomer or its mixtures with the trans isomer.

Particularly interesting odoriferous effects are obtained by adding the cyclic ether of this invention to perfume compositions containing citronellol as one of their ingredients.

*Example 6*

The procedure described in Example 5 is repeated, except that 50 g. of citronellyl acetate prepared from levorotatory citronellol ($\alpha_D = -3.6°$) are used instead of 50 g. of dextro-rotatory citronellyl acetate. The cyclization product thus obtained is identical with that prepared according to Example 1, except that it contains the levorotatory cis and trans isomers of 2-(2-methyl-1-propen-1-yl)-4-methyl-tetrahydropyran, $\alpha_D = -35°$.

The value of the rotation (levo or dextro) of the cyclic ether of this invention is variable and depends upon the rotation of the citronellyl acetate used for preparing the starting alcohol or alcohols.

In the appended claims the term "2-(2-methyl-1-propen-1-yl)-4-methyl-tetrahydropyran" is to be understood as including the cis and trans isomers as well as the corresponding optically active forms.

The particular ingredients and their proportions in the perfume compositions described in Examples 2 to 5 are purely illustrative and are not construed as a limitation of the present invention. It will be apparent to those skilled in the art that the cyclic ether of this invention can be used in widely varying proportions in the preparation of numerous other types of perfumes.

We claim:

1. 2-(2-methyl-1-propen-1-yl)-4-methyl-tetrahydropyran.
2. A composition of matter selected from the group consisting of cis and trans 2-(2-methyl-1-propen-1-yl)-4-methyl-tetrahydropyran, and mixtures thereof.
3. (+)-Cis-2-(2-methyl-1-propen-1-yl)-4-methyl-tetrahydropyran.
4. (+)-Trans-2-(2-methyl-1-propen-1-yl)-4-methyl-tetrahydropyran.
5. (−)-Cis-2-(2-methyl-1-propen-1-yl)-4-methyl-tetrahydropyran.
6. (−)-Trans-2-(2-methyl-1-propen-1-yl)-4-methyl-tetrahydropyran.
7. A process for the manufacture of 2-(2-methyl-1-propen-1-yl)-4-methyl-tetrahydropyran which comprises heating a member selected from the group consisting of 1-hydroxy-3,7-dimethyl-4,6-octadiene, 1-hydroxy-3,7-dimethyl-5,7-octadiene and mixtures thereof in admixture with a catalyst comprising an aryl sulfonic acid.
8. A process for the manufacture of 2-(2-methyl-1-propen-1-yl)-4-methyl-tetrahydropyran which comprises heating a member selected from the group consisting of 1-hydroxy-3,7-dimethyl-4,6-octadiene, 1-hydroxy-3,7-dimethyl-5,7-octadiene and mixtures thereof in admixture with a catalyst comprising an aryl sulfonic acid in a hydrocarbon solvent.

9. A process for the manufacture of 2-(2-methyl-1-propen-1-yl)-4-methyl-tetrahydropyran which comprises heating, at reflux temperature, a member selected from the group consisting of 1-hydroxy-3,7-dimethyl-4,6-octadiene, 1-hydroxy-3,7-dimethyl-5,7-octadiene and mixtures thereof in admixture with a catalyst comprising p-toluene sulfonic acid in benzene.

10. A process for the manufacture of 2-(2-methyl-1-propen-1-yl)-4-methyl-tetrahydropyran which comprises heating, at reflux temperature, a member selected from the group consisting of 1-hydroxy-3,7-dimethyl-4,6-octadiene, 1-hydroxy-3,7-dimethyl-5,7-octadiene and mixtures thereof in admixture with a catalyst comprising p-toluene sulfonic acid in benzene and separating from the cyclization product one of the cis and trans isomers of 2-(2-methyl-1-propen-1-yl)-4-methyl-tetrahydropyran.

References Cited in the file of this patent
UNITED STATES PATENTS

| | | |
|---|---|---|
| 2,265,437 | Luthy | Dec. 9, 1941 |
| 3,021,342 | Manly | Feb. 13, 1962 |
| 3,022,222 | Hennis | Feb. 20, 1962 |
| 3,056,804 | Marcus | Oct. 2, 1962 |

OTHER REFERENCES

Ohloff et al.: Angewandte Chemie, vol. 73, p. 578 (Aug. 21, 1961).

Naves et al.: Societe Chemique de France, Ser. 5, pp. 645–647 (March 1961).

Naves et al.: Helvetica Chimica Acta, vol. 44, pp. 1867–72 (December 1, 1961).

Seidel et al.: Helvetica Chimica Acta, vol. 42, pp. 1830–44 (1959).

Seidel et al.: Helvetica Chimica Acta, vol. 44, pp. 598–606 (March 15, 1961).